(12) United States Patent  
Hammons, Jr. et al.

(10) Patent No.: US 8,374,272 B2  
(45) Date of Patent: *Feb. 12, 2013

(54) SPACE-TIME CODED OFDM SYSTEM FOR MMDS APPLICATIONS

(75) Inventors: A. Roger Hammons, Jr., N. Potomac, MD (US); Hesham El-Gamal, Dublin, OH (US); Lin-Nan Lee, Potomac, MD (US); Stan Kay, Rockville, MD (US); Andrew MacDonald, Damascus, MD (US); Jack Rozmaryn, Silver Spring, MD (US); Bassel Beidas, Alexandria, VA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 12/011,658

(22) Filed: Jan. 29, 2008

(65) Prior Publication Data

US 2008/0130772 A1    Jun. 5, 2008

Related U.S. Application Data

(63) Continuation of application No. 10/012,066, filed on Nov. 5, 2001, now Pat. No. 7,342,875.

(60) Provisional application No. 60/246,023, filed on Nov. 6, 2000.

(51) Int. Cl.
*H04B 7/02* (2006.01)
*H04L 1/02* (2006.01)

(52) U.S. Cl. .......................... 375/267; 375/259; 375/260

(58) Field of Classification Search .................. 375/267
See application file for complete search history.

(56) References Cited

U.S. PATENT DOCUMENTS

| | | | |
|---|---|---|---|
| 4,945,549 A | 7/1990 | Simon et al. | |
| 5,691,727 A | 11/1997 | Cyzs | |
| 5,752,173 A | 5/1998 | Tsujimoto | |
| 6,031,474 A | 2/2000 | Kay et al. | |
| 6,144,711 A | 11/2000 | Raleigh et al. | |
| 6,377,632 B1 | 4/2002 | Paulraj et al. | |
| 6,396,885 B1 | 5/2002 | Ding et al. | |
| 6,426,977 B1 | 7/2002 | Lee et al. | |
| 6,452,981 B1 | 9/2002 | Raleigh et al. | |
| 6,456,830 B2 | 9/2002 | Ogino et al. | |
| 6,473,467 B1 | 10/2002 | Wallace et al. | |
| 6,542,556 B1 | 4/2003 | Kuchi et al. | |
| 6,647,077 B1 | 11/2003 | Shan et al. | |
| 6,757,265 B1 | 6/2004 | Sebastian et al. | |
| 6,771,706 B2 * | 8/2004 | Ling et al. | ....................... 375/267 |
| 6,785,341 B2 | 8/2004 | Walton et al. | |
| 6,862,271 B2 | 3/2005 | Medvedev et al. | |
| 6,865,237 B1 | 3/2005 | Boariu et al. | |
| 6,928,047 B1 | 8/2005 | Xia | |
| 6,959,047 B1 | 10/2005 | Al-Dhahir et al. | |
| 7,006,848 B2 | 2/2006 | Ling et al. | |
| 7,027,536 B1 | 4/2006 | Al-Dhahir | |
| 7,145,971 B2 * | 12/2006 | Raleigh et al. | ................. 375/347 |
| 7,609,782 B2 * | 10/2009 | Giannakis et al. | ............. 375/299 |
| 2002/0003842 A1 | 1/2002 | Suzuki et al. | |
| 2002/0027957 A1 * | 3/2002 | Paulraj et al. | ................. 375/267 |
| 2002/0059552 A1 | 5/2002 | Murillo | |
| 2002/0122465 A1 * | 9/2002 | Agee et al. | ..................... 375/141 |
| 2002/0154705 A1 | 10/2002 | Walton et al. | |
| 2004/0095907 A1 * | 5/2004 | Agee et al. | ..................... 370/334 |
| 2007/0019754 A1 | 1/2007 | Raleigh et al. | |
| 2009/0310586 A1 * | 12/2009 | Shatti | ............................ 370/338 |
| 2011/0310996 A1 * | 12/2011 | Raleigh et al. | ................ 375/295 |

* cited by examiner

*Primary Examiner* — Erin File

(57) ABSTRACT

A communications system includes a base station that is configured to transmit a signal that is modulated according to a predetermined modulation scheme and an orthogonal frequency division multiplexing scheme, wherein the signal is encoded using space-frequency coding. The base station includes a plurality of multiple-input multiple-output (MIMO) transceivers. The system includes a terminal that is configured to receive the modulated signal. The above arrangement is particularly applicable to providing multi-channel multipoint distribution services (MMDS) over a radio communications system.

14 Claims, 6 Drawing Sheets

SPACE-TIME CODED OFDM SYSTEM FOR MMDS APPLICATIONS

CROSS-REFERENCES TO RELATED APPLICATION

This application is a continuation of U.S. patent application Ser. No. 10/012,066, filed Nov. 5, 2001 now U.S. Pat. No. 7,342,875, entitled "Space-Time Coded OFDM System for MMDS Applications" by A. Roger Hammons, Jr., Hesham El-Gamal, Lin-Nan Lee, Stan Kay, Andrew MacDonald, Jack Rozmaryn and Bassel Beidas, and is related to, and claims the benefit of the earlier filing date of U.S. Provisional Patent Application Ser. No. 60/246,023, filed Nov. 6, 2000, entitled "Space-Time Codes OFDM System for MMDS Applications," the entireties of which are incorporated herein by reference.

BACKGROUND OF THE INVENTION

1. Field of the Invention

The present invention relates to coding in a communications system, and is more particularly related to space-time codes that exploit multiple forms of diversity.

2. Discussion of the Background

Given the multiple-input multiple-output (MIMO) transceivers constant demand for higher system capacity of wireless systems, multiple antenna systems have emerged to increase system bandwidth vis-à-vis single antenna systems. In multiple antenna systems, data is parsed into multiple streams, which are simultaneously transmitted over a corresponding quantity of transmit antennas. At the receiving end, multiple receive antennas are used to reconstruct the original data stream. To combat the detrimental effects of the communication channel, communication engineers are tasked to develop channel codes that optimize system reliability and throughput in a multiple antenna system.

To minimize the effects of the communication channel, which typically is Rayleigh, space-time codes have been garnered significant attention. Rayleigh fading channels introduce noise and attenuation to such an extent that a receiver may not reliably reproduce the transmitted signal without some form of diversity; diversity provides a replica of the transmitted signal. Space-time codes are two dimensional channel codes that exploit spatial transmit diversity, whereby the receiver can reliably detect the transmitted signal. Conventional designs of space-time codes have focused on maximizing spatial diversity in quasi-static fading channels and fast fading channels. However, real communications systems exhibit channel characteristics that are somewhere between quasi-static and fast fading. Accordingly, such conventional space-time codes are not optimized.

Further, other approaches to space-time code design assume that channel state information (CSI) are available at both the transmitter and receiver. Thus, a drawback of such approaches is that the design requires the transmitter and receiver to have knowledge of the CSI, which increases implementation costs because of the need for additional hardware. Moreover, these approaches view the transmit diversity attending the use of space-time codes as a substitute for time diversity; consequently, such space-time codes are not designed to take advantage of other forms of diversity.

Notably, information theoretic studies have shown that spatial diversity provided by multiple transmit and/or receive antennas allows for a significant increase in the capacity of wireless communications systems operated in a flat Rayleigh fading environment [1] [2]. Following this observation, various approaches for exploiting this spatial diversity have been proposed. In one approach, channel coding is performed across the spatial dimension as well as time to benefit from the spatial diversity provided by using multiple transmit antennas [3]. Tarokh et al. coined the term "space-time coding" for this scheme. One potential drawback of this scheme is that the complexity of the maximum likelihood (ML) decoder is exponential in the number of transmit antennas. Another approach, as proposed by Foshini [5], relies upon arranging the transmitted data stream into multiple independent layers and sub-optimal signal processing techniques at the receiver to achieve performance that is asymptotically close to the outage capacity with reasonable complexity. In this approach, no effort is made to optimize the channel coding scheme.

Conventional approaches to space-time coding design have focused primarily on the flat fading channel model. With respect to the treatment of MIMO frequency selective channels, one approach contends the that space-time codes that are designed to achieve a certain diversity order in flat fading channels achieve at least the same diversity order in frequency selective fading channels. Such an approach fails to exploit the spatial and frequency diversity available in the channel.

Based on the foregoing, there is a clear need for improved approaches for providing a system that utilizes space-time codes that can be utilized in a MIMO selective fading channel. There is also a need to design space-time codes that can exploit spatial diversity as well as time diversity. There is also a need to improve system reliability without reducing transmission rate. There is a further need to simplify the receiver design. Therefore, an approach for employing space-time codes that can enhance system reliability and throughput in a multiple antenna system is highly desirable.

SUMMARY OF THE INVENTION

The present invention addresses the above stated needs by providing a multichannel multipoint distribution service (MMDS) system that employs space-time codes to transmit and receives signals under Line-of-Sight (LOS) and non-LOS operating conditions via multiple-input multiple-output transceivers. The system utilizes orthogonal frequency division multiplexing (OFDM) with a quadrature phase shift keying (QPSK) sub-carrier modulation, according to one embodiment of the present invention. The space-time coding, which may be adaptive, effectively exploits the use of the MIMO transceivers. Further, the MMDS system provides an automatic repeat requests (ARQ) error control mechanism.

According to one aspect of the present invention, a method is provided for communicating over a radio communications system. The method includes encoding a signal using space-frequency coding, and modulating the encoded signal according to a predetermined modulation scheme and an orthogonal frequency division multiplexing scheme. The method also includes transmitting the modulated signal to a terminal using a plurality of MIMO transceivers.

According to another aspect of the present invention, a device is provided for communicating over a radio communications system. The device includes an encoder that is configured to encode a signal using space-frequency coding. The device also includes a modulator that is configured to modulate the encoded signal according to a predetermined modulation scheme and an orthogonal frequency division multiplexing scheme. Further, the device includes a plurality of MIMO transceivers that are coupled to the modulator. Each of the transceivers is configured to transmit the modulated signal to a terminal.

According to one aspect of the present invention, a communications system for providing multichannel multipoint distribution services is disclosed. The system includes a base station that is configured to transmit a signal that is modulated according to a predetermined modulation scheme and an orthogonal frequency division multiplexing scheme, wherein the signal is encoded using space-frequency coding. The base station includes a plurality of MIMO transceivers. The system includes a terminal that is configured to receive the modulated signal.

According to another aspect of the present invention, an apparatus is provided for communicating over a radio communications system. The apparatus includes means for encoding a signal using space-frequency coding; means for modulating the encoded signal according to a predetermined modulation scheme and an orthogonal frequency division multiplexing scheme; and means for transmitting the modulated signal to a terminal using a plurality of MIMO transceivers.

In yet another aspect of the present invention, a computer-readable medium carrying one or more sequences of one or more instructions for communicating over a radio communications system is disclosed. The one or more sequences of one or more instructions including instructions which, when executed by one or more processors, cause the one or more processors to perform the step of encoding a signal using space-frequency coding. The encoded signal is modulated according to a predetermined modulation scheme and an orthogonal frequency division multiplexing scheme, wherein the modulated signal is transmitted a terminal using a plurality of MIMO transceivers.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Figure 1:
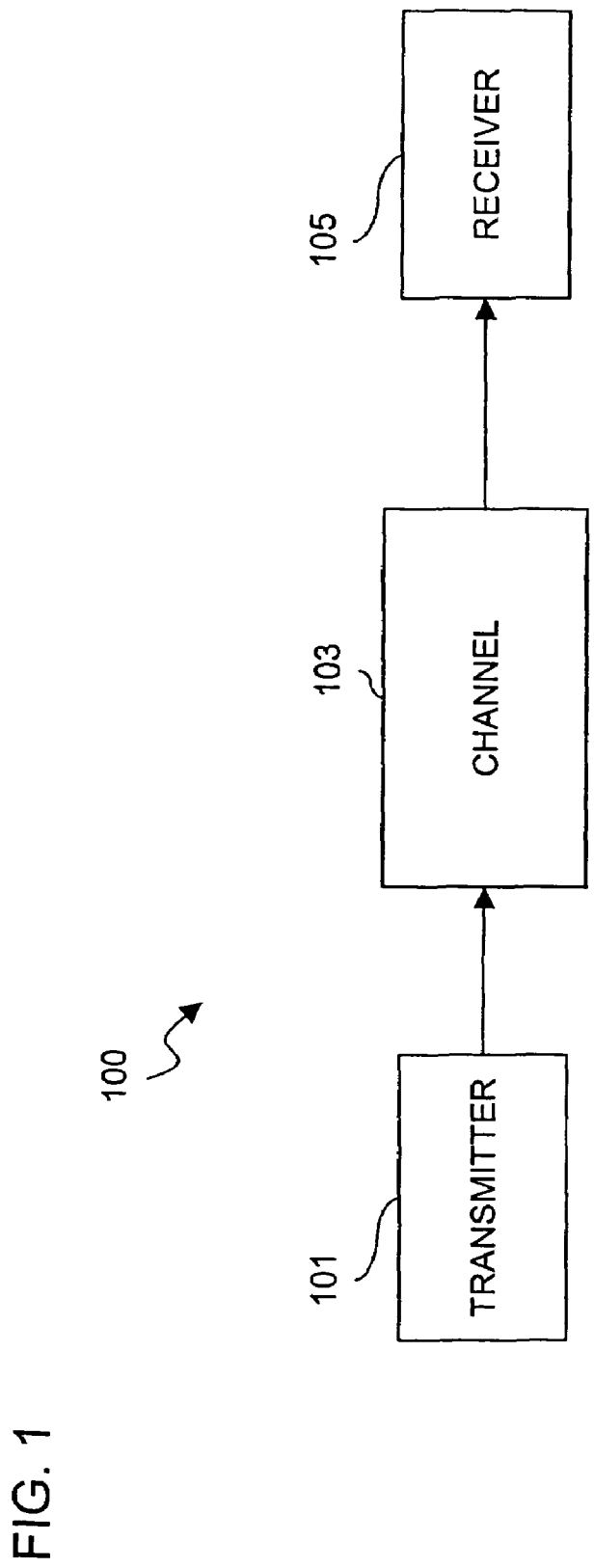
FIG. 1 is a diagram of a communications system configured to utilize space-time codes, according to an embodiment of the present invention.

FIG. 1 shows a diagram of a communications system configured to utilize space-time codes, according to an embodiment of the present invention. A digital communications system 100 includes a transmitter 101 that generates signal waveforms across a communication channel 103 to a receiver 105. In the discrete communications system 100, transmitter 101 has a message source that produces a discrete set of possible messages; each of the possible messages have a corresponding signal waveform. These signal waveforms are attenuated, or otherwise altered, by communications channel 103. One phenomena of interest is Intersymbol Interference (ISI), in which the channel 103 causes the overlap of signal pulses, resulting in the lost of signal orthogonality. As described with respect to the construction of space-frequency codes, the channel ISI characteristics are minimized. It is evident that receiver 105 must be able to compensate for the attenuation that is introduced by channel 103.

To assist with this task, transmitter 101 employs coding to introduce redundancies that safeguard against incorrect detection of the received signal waveforms by the receiver 105. To minimize the impact of the communication channel 103 on the transmission signals, channel coding is utilized. An algebraic design framework for layered and non-layered space-time codes in flat fading channels are in the following: A. R. Hammons Jr. and H. El Gamal. "On the theory of space-time codes for PSK modulation," *IEEE Trans. Info. Theory*, March 2000; and H. El Gamal and A. R. Hammons Jr. "The layered space-time architecture: a new prospective," *IEEE Trans. Info. Theory*, 1999; each of which is incorporated herein by reference in its entirety.

Based upon the algebraic design framework for space-time coding in flat fading channels in "On the Theory of Space-Time Codes for PSK Modulation," A. R. Hammons Jr. and H. El Gamal, *IEEE Trans. Info. Theory*, March 2000, the present invention extends this framework to design algebraic codes for multi-input multi-output (MIMO) frequency selective fading channels. The codes, according to the present invention, optimally exploit both the spatial and frequency diversity available in the channel. Two design approaches with different complexity-versus-diversity advantage trade-offs are considered. The first approach (referred to as "single carrier time domain design" approach or STC (space-time coding)), which is more fully described below in FIG. 3A, uses space-time coding and maximum likelihood (ML) decoding to exploit the multipath nature of the channel. The second approach utilizes an orthogonal frequency division multiplexing (OFDM) technique to transform the multi-path channel into a block fading channel (referred to as "OFDM based design" approach or SFC (space-frequency coding)); this approach is detailed in the discussion of FIG. 3B. The new algebraic framework, according to one embodiment of the present invention, is then used to construct space-frequency codes that optimally exploit the diversity available in the resulting block fading channel.

The two approaches, according to the present invention, differ in terms of decoder complexity, maximum achievable diversity advantage, and simulated frame error rate performance. The first approach requires relatively greater complexity at the receiver 105 over the second approach, in that the first approach combines algebraic space-time coding with maximum likelihood decoding to achieve the maximum possible diversity advantage in MIMO frequency selective channels to achieve the diversity advantage. As a result, this first approach has a relatively large trellis complexity, as required by the maximum likelihood receiver 105. The second approach utilizes an orthogonal frequency division multiplexing (OFDM) front-end to transform an intersymbol-interference (ISI) fading channel into a flat block fading channel.

Figure 2:
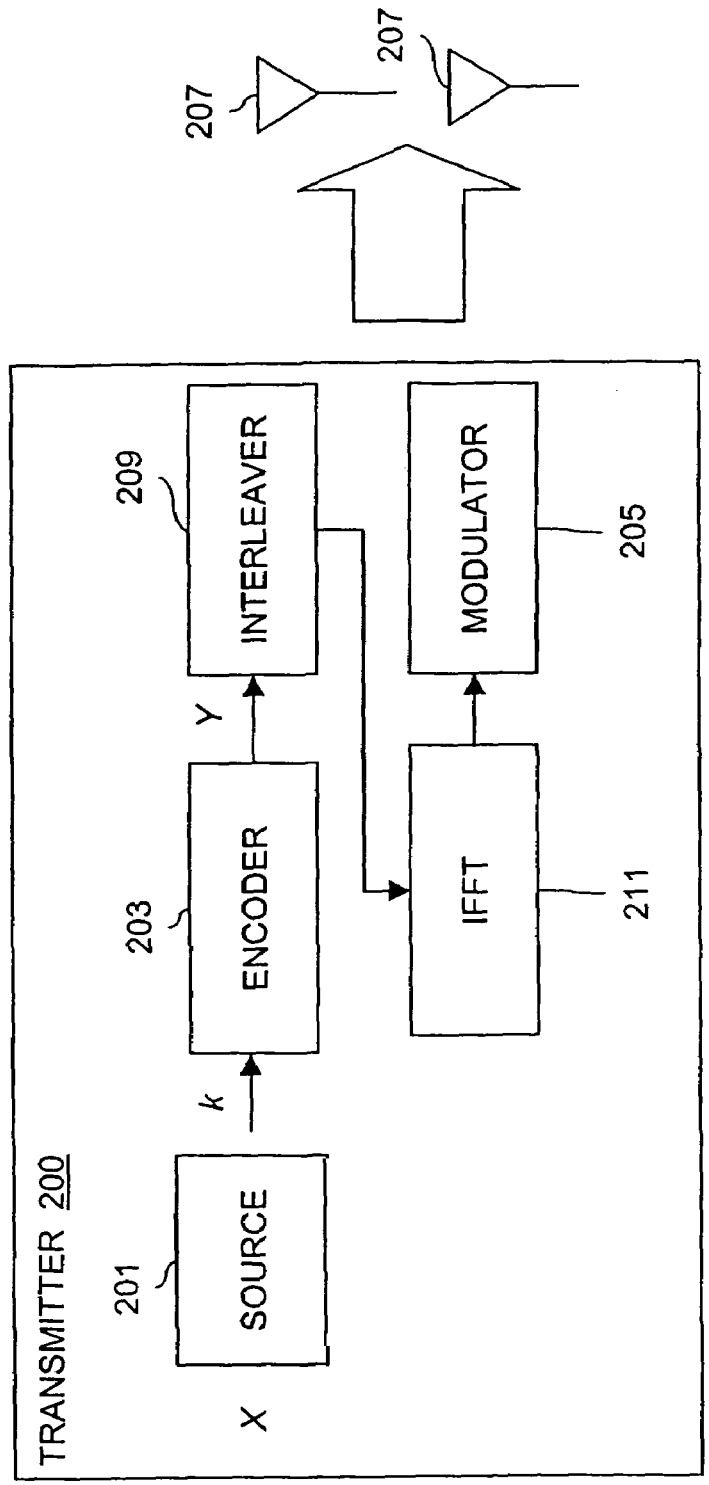
FIG. 2 is a diagram of an encoder that generates space-time codes, in accordance with an embodiment of the present invention.

FIG. 2 shows a diagram of an encoder that generates space-time codes, in accordance with an embodiment of the present invention. A transmitter 200 is equipped with a channel encoder 203 that accepts input from an information source 201 and outputs coded stream of higher redundancy suitable for error correction processing at the receiver 105 (FIG. 1). The information source 201 generates k signals from a discrete alphabet, X'. Encoder 203 generates signals from alphabet Y to a modulator 205. Modulator 205 maps the encoded messages from encoder 203 to signal waveforms that are transmitted to $L_t$ number of antennas 207, which emit these waveforms over the communication channel 103. Accordingly, the encoded messages are modulated and distributed among the $L_t$ antennas 207. The transmissions from each of the $L_t$ transmit antennas 207 are simultaneous and synchronous.

Figure 3A:
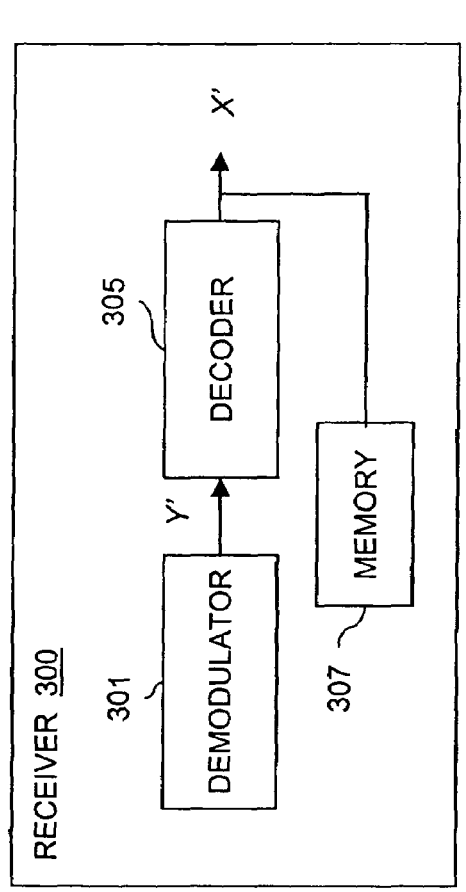
FIGS. 3A and 3B are diagrams of receivers that employ space-time codes and space-frequency codes, respectively, according to various embodiments of the present invention.

FIG. 3A shows a diagram of a decoder that decodes space-time codes, according to an embodiment of the present invention. At the receiving side, a receiver 300 includes a demodulator 301 that performs demodulation of received signals from transmitter 200. These signals are received at multiple antennas 303. The signal received at each antenna 303 is therefore a superposition of the $L_t$ transmitted signals corrupted by additive white Gaussian noise (AWGN) and the multiplicative intersymbol interference (ISI) fading. After demodulation, the received signals are forwarded to a decoder 305, which attempts to reconstruct the original source messages by generating messages, X'. Receiver 300, according to one embodiment of the present invention, has a memory 307 that stores channel state information (CSI) associated with the communication channel 103. Conventional communications systems typically require that CSI be available at both the transmitter and the receiver. By contrast, the present invention, according to one embodiment, does not require CSI at the transmitter 200, thus, providing a more robust design.

At the receiver 300, the signal $r_t^j$ received by antenna j at time t is given by $$r_t^j = \sqrt{E_s} \sum_{l=0}^{L_{ISI}-1} \sum_{i=1}^{L_t} \alpha_l^{ij} s_{t-l}^i + n_t^j$$

where $\sqrt{E_s}$ is the energy per transmitted symbol; $\alpha_l^{ij}$ is the complex path gain from transmit antenna i to receive antenna j for the lth path; $L_{ISI}$ is the length of the channel impulse response; $s_t^i$ is the symbol transmitted from antenna i at time t; $n_t^j$ is the additive white Gaussian noise sample for receive antenna j at time t. The noise samples are independent samples of circularly symmetric zero-mean complex Gaussian random variable with variance $N_0/2$ per dimension. The different path gains $\alpha_l^{ij}$ are assumed to be statistically independent.

A space-time code is defined to include an underlying error control code together with a spatial parsing formatter. Specifically, an $L_t \times 1$ space-time code C of size M has an $(L_t l, M)$ error control code C and a spatial parser σ that maps each code word vector $\bar{c} \in C$ to an $L_t \times 1$ matrix c whose entries are a rearrangement of those of $\bar{c}$. The space-time code C is said to be linear if both C and σ are linear.

It is assumed that the standard parser maps $$\bar{c}=(c_1^{(1)}, c_1^{(2)}, \ldots, c_1^{(L_t)}, c_2^{(1)}, c_2^{(2)}, \ldots, c_2^{(L_t)}, \ldots, c_l^{(1)}, c_l^{(2)}, \ldots, c_l^{(L_t)}) \in C$$

to the matrix $$c = \begin{bmatrix} c_1^1 & c_2^1 & \cdots & c_n^1 \\ c_1^2 & c_2^2 & \cdots & c_n^2 \\ \vdots & \vdots & \ddots & \vdots \\ c_1^{L_t} & c_2^{L_t} & \cdots & c_n^{L_t} \end{bmatrix}$$

The baseband code word f(c) is obtained by applying the modulation operator f on the components of c. This modulation operator maps the entries of c into constellation points from the discrete complex-valued signaling constellation Ω for transmission across the channel. In this notation, it is understood that $c_t^{(i)}$ is the code symbol assigned to transmit antenna i at time t and $s_t^{(i)} = f(c_t^{(i)})$.

The diversity advantage of a space-time code is defined as the minimum absolute value of the slope of any pairwise probability of error versus signal-to-noise ratio curve on a log-log scale. To maximize the spatial diversity advantage provided by the multiple transmit antenna in quasi-static flat fading MIMO channels, the following rank criterion is utilized [3][4]: for the baseband rank criterion, d=rank(f(c)−f(e)) is maximized over all pairs of distinct code words c, e∈C. Therefore full spatial transmit diversity is achieved if and only if rank(f(c)−f(e))=$L_t$ for all pairs of distinct code words c, e∈C. It should be noted that in the presence of $L_r$ receive antennas 303, the total diversity advantage achieved by this code is $L_t L_r$.

Space-time code constructions for frequency selective fading channels is based on the concept that in an ISI (intersymbol interference) environment with $L_{ISI}$ paths, a space-time system with $L_t$ transmit antennas 207 is equivalent to a space-time system operating in flat fading channel with $L_t L_{ISI}$ transmit antenna 207. However, in this equivalent model the code word matrices are restricted to have a certain special structure. This structure is captured in the following definition for the baseband code word matrix in ISI environments:

$$f(c)_{ISI} = \begin{bmatrix} f(c) & \underline{0} & \cdots & 0 \\ 0 & f(c) & \cdots & 0 \\ \vdots & \vdots & \ddots & \vdots \\ 0 & 0 & \cdots & f(c) \end{bmatrix}$$

where c is the code word matrix as defined in (2) below, and $\underline{0}$ is the $L_t \times 1$ all zero vector. From the equivalent model, it is clear that in the frequency selective fading channels, space-time codes can be constructed to achieve $L_t L_{ISI}$ transmit diversity order. Therefore, the following baseband design criterion for space-time codes in the ISI channel is established: for ISI baseband rank criterion, $d=\text{rank}(f_{ISI}(c)-f_{ISI}(e))$ is maximized over all pairs of distinct code words $c, e \in C$. Full transmit diversity in this scenario is equal to $L_t L_{ISI}$, and is achieved if and only if $\text{rank}(f_{ISI}(c)-f_{ISI}(e))=L_t L_{ISI}$ for all pairs of distinct code words $c, e \in C$.

Next, the binary rank criteria is developed; this criteria facilitate the construction of algebraic space-time codes for BPSK (Binary Phase-Shift Keying) and QPSK (Quadrature Phase-Shift Keying) modulated systems with an arbitrary number of transmit antennas 207 and channel impulse response lengths. A new code word matrix $c_{ISI}$ that captures the nature of the ISI channel is defined as follows:

$$c_{ISI} = \begin{bmatrix} c & 0 & \cdots & 0 \\ 0 & c & \cdots & 0 \\ \vdots & \vdots & \ddots & \vdots \\ 0 & 0 & \cdots & c \end{bmatrix}$$

It is first observed that in general $$f(c_{ISI}) \neq f(c)_{ISI} \quad (2)$$

since $$f(0) \neq 0$$

However, it is noted the diversity advantage only depends on differences between code words rather than the code words themselves, and thus $$f(c_{ISI}) - f(e_{ISI}) = f(c)_{ISI} - f(e)_{ISI}$$

for any signaling constellation. The previous result is the key to the algebraic space-time constructions developed in this section.

Attention is now turned to the development of BPSK modulated codes, which may be utilized in the communications system 100 of FIG. 1. For BPSK modulation, elements in $c$ are drawn from the field $F=\{0,1\}$ of integers modulo 2. The modulation operator/maps the symbol $c_t^{(i)} \in F$ to the constellation point $s_t^{(i)} = f(c_t^{(i)}) \in \{-1, 1\}$ according to the rule $f(c_t^{(i)}) = (-1)^{c_t^{(i)}}$. The binary rank criterion for full diversity space-time codes in ISI channels can thus be stated as follows.

With respect to the ISI channel binary rank criterion, it is assumed that C is a linear $L_t \times l$ space-time code with underlying binary code C of length $N = L_t l$ operating in an ISI channel with $L_{ISI}$ paths, where $l \geq L_t L_{ISI}$. Also, assuming that every non-zero code word c corresponds to a matrix $c_{ISI}$ of full rank $L_t L_{ISI}$ over the binary field F, then, for BPSK transmission over the frequency selective quasi-static fading channel 103, the space-time code C achieves full transmit diversity $L_t L_{ISI}$.

While the previous result was stated for full transmit diversity codes, it readily generalizes to any order of transmit diversity less than or equal to $L_t L_{ISI}$. The ISI channel binary rank criterion permits the use of a stacking construction that establishes an algebraic framework for the design of algebraic space-time codes for MIMO ISI fading channels. According to an embodiment of the present invention, the ISI channel stacking construction, $M_1, M_2, \ldots, M_{L_t}$ are binary matrices of dimension $k \times l, l \geq k$, and C is the $L_t \times l$ space-time code of dimension k including the code word matrices $$c = \begin{bmatrix} xM_1 \\ xM_2 \\ \vdots \\ xM_{L_t} \end{bmatrix},$$

where x denotes an arbitrary k-tuple of information bits and $L_t < l$. The following is denoted $$M_{n,m} = [O_{L_t \times (m-1)} M_n O_{L_t \times (L_{ISI}+1-m)}],$$

where $O_{L_t \times (m-1)}$ is the $L_t \times (m-1)$ all zero matrix. Hence, C satisfies the ISI channel binary rank criterion, and accordingly, for BPSK transmission over the quasi-static fading channel, achieves full transmit diversity $L_t L_{ISI}$, if and only if $M_{1,1}, M_{2,1}, \ldots, M_{L_t L_{ISI}}$ have the property that $\forall \alpha_1, \alpha_2, \ldots, \alpha_{L_t} \in F$:
$M = \alpha_1 M_{1,1} \oplus \alpha_2 M_{2,1} \oplus \ldots \oplus \alpha_{L_t L_{ISI}} M_{L_t L_{ISI}}$ is of full rank k unless $\alpha_1 = \ldots \alpha_{L_t L_{ISI}} = 0$. It is noted that $$c_{ISI} = \begin{bmatrix} xM_{1,1} \\ xM_{1,2} \\ \vdots \\ xM_{L_t, L_{ISI}} \end{bmatrix}.$$

The stacking construction is general and applies to block codes as well as trellis codes. An important example of the stacking construction is given by the class of binary convolutional codes. This class is important because it allows for a reasonable complexity maximum likelihood decoder. Let C be the binary, rate $1/L_t$, convolutional code having transfer function matrix [6]

$$G(D) = [g_1(D), g_2(D), \ldots, g_{L_t 1}(D), \ldots, g_{L_t L_{ISI}}(D)],$$

then the natural space-time code C associated with C is defined to include the code word matrices $c(D) = G^T(D)x(D)$, where the polynomial x(D) represents the input information bit stream. In other words, for the natural space-time code, the natural transmission format is adopted, in which the output coded bits generated by $g_i(D)$ are transmitted via antenna i. It is assumed the trellis codes are terminated by tail bits [3]. Thus, if x(D) is restricted to a block of N information bits, then C is an $L_t \times (N+v)$ space-time code, where $v = \max_{1 \leq i \leq L_t} \{\deg g_i(x)\}$ is the maximal memory order of the convolutional code C. The following is denoted $$G_{ISI}(D) = [g_{1,1}(D), g_{2,1}(D), \ldots, g_{L_t 1}(D), \ldots, g_{L_t L_{ISI}}(D)]$$

where $g_{n,m} = D^{(m-1)} g_n$. The following characterizes the result of the performance of natural space-time convolutional codes in ISI channels.

The natural space-time code C associated with the rate $1/L_t$ convolutional code C satisfies the binary rank criterion, and thus achieves full transmit diversity for BPSK transmission in an ISI channel with $L_{ISI}$ paths, if and only if the transfer function matrix $G_{ISI}(D)$ of C has full rank $L_t L_{ISI}$ as a matrix of coefficients over F. This result stems from the observation that $$\sum_{1 \leq i \leq L_t, 1 \leq j \leq L_{ISI}} a_{i,j} g_{i,j}(D) x(D) = 0 \text{ for some}$$

-continued $$x(D) \neq 0 \text{ iff } \sum_{1 \leq i \leq L_t, 1 \leq j \leq L_{ISI}} a_{i,j} g_{i,j}(D) = 0.$$

This observation readily generalizes to recursive convolutional codes.

The above result extends to convolutional codes with arbitrary rates and arbitrary diversity orders. Since the coefficients of $G_{ISI}(D)$ form a binary matrix of dimension $L_t L_{ISI} \times (v + L_{ISI})$, and the column rank must be equal to the row rank, the result provides a simple bound as to how complex the convolutional code must be in order to satisfy the full diversity ISI channel binary rank criterion.

The maximum diversity order achieved by a space-time code based on an underlying rate $1/L_t$ convolutional code C with a maximal memory order v in a $L_{ISI}$ paths ISI channel is $v + L_{ISI}$. This bound shows that, for a fixed trellis complexity, increasing the number of antennas beyond $$L_t = \frac{v + L_{ISI}}{L_{ISI}}$$

will not result in an increase in the diversity advantage. This fact is supported by the results in Table 1, below, which lists the diversity advantage for BPSK algebraic space-time codes with optimal free distance for MIMO frequency selective fading channels:

TABLE 1

| $L_t$ | v | Connection Polynomials | d for $L_{ISI}=1$ | d for $L_{ISI}=2$ | d for $L_{ISI}=3$ | d for $L_{ISI}=4$ |
|---|---|---|---|---|---|---|
| 2 | 2 | 5, 7 | 2 | 4 | 5 | 6 |
|   | 3 | 64, 74 | 2 | 4 | 6 | 7 |
|   | 4 | 46, 72 | 2 | 4 | 6 | 8 |
|   | 5 | 65, 57 | 2 | 4 | 6 | 8 |
|   | 6 | 554, 744 | 2 | 4 | 6 | 8 |
| 3 | 3 | 54, 64, 74 | 3 | 5 | 6 | 7 |
|   | 4 | 52, 66, 76 | 3 | 6 | 7 | 8 |
|   | 5 | 47, 53, 75 | 3 | 6 | 8 | 9 |
|   | 6 | 554, 624, 764 | 3 | 6 | 9 | 10 |
| 4 | 4 | 52, 56, 66, 76 | 4 | 6 | 7 | 8 |
|   | 5 | 53, 67, 71, 75 | 4 | 7 | 8 | 9 |
| 5 | 5 | 75, 71, 73, 65, 57 | 5 | 7 | 8 | 9 |

Because the number of paths is not known a priori at the transmitter 200, it is desirable to construct space-time codes that achieve the maximum diversity order for arbitrary number of paths. This leads to the notion of universal space-time codes that combine the maximum spatial diversity with the ISI channel frequency diversity whenever available. Within the class of universal space-time codes with maximum diversity advantage, it is ideal to select the code with the maximum product distance, which measures the asymptotic coding achieved by the code [3] [4].

Although BSPK modulation is discussed, it is recognized that the extension to QPSK modulation can be readily made. The ISI binary rank criterion and stacking construction for BPSK modulation can be generalized to obtain similar results for QPSK modulation. As a consequence of the QPSK ISI binary rank criterion and stacking construction, it is observed that the binary connection polynomials of Table 1 can be used to generate linear, $Z_4$-valued, rate $1/L_t$ convolutional codes whose natural space-time formatting achieves full spatial diversity $L_t L_{ISI}$ for QPSK modulation. More generally, any set of $Z_4$-valued connection polynomials with modulo 2 projections (shown Table 1) may be used. In most cases under consideration, the best performance was obtained from the lifted $Z_4$ codes constructed by replacing the zero coefficients by twos. This lifting produces the codes in Table 2, which lists $Z_4$ space-time codes for QPSK modulation in MIMO frequency selective fading channels.

TABLE 2

| $L_t$ | v | Connection Polynomials |
|---|---|---|
| 2 | 1 | $1 + 2D, 2 + D$ |
|   | 2 | $1 + 2D + D^2, 1 + D + D^2$ |
|   | 3 | $1 + D + 2D^2 + D^3, 1 + D + D^2 + D^3$ |
|   | 4 | $1 + 2D + 2D^2 + D^3 + D^4, 1 + D + D^2 + 2D^3 + D^4$ |
|   | 5 | $1 + D + 2D^2 + D^3 + 2D^4 + D^5, 1 + 2D + D^2 + D^3 + D^4 + D^5$ |
| 3 | 2 | $1 + 2D + 2D^2, 2 + D + 2D^2, 1 + D + 2D^2$ |
|   | 3 | $1 + D + 2D^2 + D^3, 1 + D + 2D^2 + D^3, 1 + D + D^2 + D^3$ |
|   | 4 | $1 + 2D + D^2 + 2D^3 + D^4, 1 + D + 2D^2 + D^3 + D^4, 1 + D + D^2 + D^3 + D^4$ |
|   | 5 | $1 + 2D + 2D^2 + D^3 + D^4 + D^5, 1 + 2D + D^2 + 2D^3 + D^4 + D^5, 1 + D + D^2 + D^3 + 2D^4 + D^5$ |
| 4 | 3 | $1 + 2D + 2D^2 + 2D^3, 2 + D + 2D^2 + 2D^3, 2 + 2D + D^2 + 2D^3, 2 + 2D + 2D^2 + D^3$ |
|   | 4 | $1 + 2D + D^2 + 2D^3 + D^4, 1 + D + 2D^2 + D^3 + D^4, 1 + D + 2D^2 + D^3 + D^4, 1 + D + D^2 + D^3 + D^4$ |
|   | 5 | $1 + 2D + D^2 + 2D^3 + D^4 + D^5, 1 + D + 2D^2 + D^3 + D^4 + D^5, 1 + D + D^2 + 2D^3 + 2D^4 + D^5, 1 + D + D^2 + D^3 + 2D^4 + D^5$ |
| 5 | 4 | $1 + 2D + 2D^2 + 2D^3 + 2D^4, 2 + D + 2D^2 + 2D^3 + 2D^4, 2 + 2D + D^2 + 2D^3 + 2D^4, 2 + 2D + 2D^2 + D^3 + D^4$ |
|   | 5 | $1 + D + D^2 + D^3 + 2D^4 + D^5, 1 + D + D^2 + 2D^3 + 2D^4 + D^5, 1 + D + 2D^2 + D^3 + 2D^4 + D^5, 1 + D + 2D^2 + D^3 + 2D^4 + D^5, 1 + 2D + D^2 + D^3 + 2D^4 + D^5$ |

The described single carrier time domain design approach requires the use of a relatively more complex maximum likelihood decoder 305 to account for the multi-input multi-output ISI nature of the channel 103. In an exemplary embodiment, this maximum likelihood decoder 305 can be realized using a Viterbi decoder with trellis complexity proportional to $2^{(L_{ISI}+v)}$ and $4^{(L_{ISI}+v)}$ for BPSK and QPSK modulations, respectively (wherein v is the maximal memory order of the underlying convolutional code).

If receiver complexity presents an issue, which is conceivable in certain applications, then a second design approach may be implemented. Such an approach uses space-frequency codes. In particular, to reduce the complexity of the receiver 300, an OFDM front-end 313 is utilized to transform the ISI channel into a flat, however, selective fading channel. The baseband signal assigned to each antenna 207 is passed through an inverse fast Fourier transform (IFFT) before transmission. The transmitted signal from antenna i at the nth interval is given by $$x_n^i = \sum_{k=0}^{N-1} s_k^i \exp\left(-j\frac{2\pi k n}{N}\right),$$

where N is block length. A cyclic prefix of length $L_{ISI}-1$ is added to eliminate the ISI between consecutive OFDM symbols. At the receiver end, the signal $y_n^j$ received by antenna j at time t is given by $$y_n^j = \sqrt{E_s} \sum_{l=0}^{L_{ISI}-1} \sum_{i=1}^{L_t} \alpha_l^{ij} x_{t-l}^j + n_t^j$$

$$= \sqrt{E_s} \sum_{l=0}^{L_{ISI}-1} \sum_{i=1}^{L_t} \sum_{k=0}^{N-1} \alpha_l^{ij} s_k^i \exp\left(-j\frac{2\pi k(n-1)}{N}\right) + n_t^j$$

The fast Fourier transform (FFT) operator is then applied to the received signal to yield $$r_t^j = \sum_{n=0}^{N-1} y_k^j \exp\left(-j\frac{2\pi nt}{N}\right)$$

$$= \sum_{i=1}^{L_t} \left(\sum_{l=0}^{L_{ISI}-1} \alpha_l^{ij} \exp\left(-j\frac{2\pi nt}{N}\right)\right) s_t^i + N_t^j$$

$$= \sum_{i=1}^{L_t} H_t^{(ij)} s_t^i + N_t^j,$$

where $N_t^j$ are independent noise samples of circularly symmetric zero-mean complex Gaussian random variable with variance $N_0/2$ per dimension. The complex fading coefficients of the equivalent channel model $H_t^{ij}$ have the following auto-correlation function:

$$R(i_1 - i_2, j_1 - j_2, t_1 - t_2) = E\left(H_{t_1}^{(i_1 j_1)} H_{t_2}^{(i_2 j_2)*}\right)$$

$$= \delta(i_1 - i_2, j_1 - j_2) \sum_{l=0}^{L_{ISI}-1} \exp\left(-j\frac{2\pi l(t_1 - t_2)}{N}\right),$$

where $\delta(i,j)$ is the dirac-delta function. It is clear that the fading coefficients of the equivalent channel are spatially independent [6] and that $$R\left(0, 0, \frac{kN}{L_{ISI}}\right) = 0$$

for $k=1, 2, \ldots, L_{ISI}-1$. This observation suggests that the equivalent fading channel can be approximated by the piecewise constant block fading channel. In this model the code word encompasses $L_{ISI}$ fading blocks. It is assumed that the complex fading gains are constant over one fading block, but are independent from block to block. Another type of receiver may be utilized in the event that receiver complexity presents a key design concern, as shown in FIG. 3B.

Figure 3B:
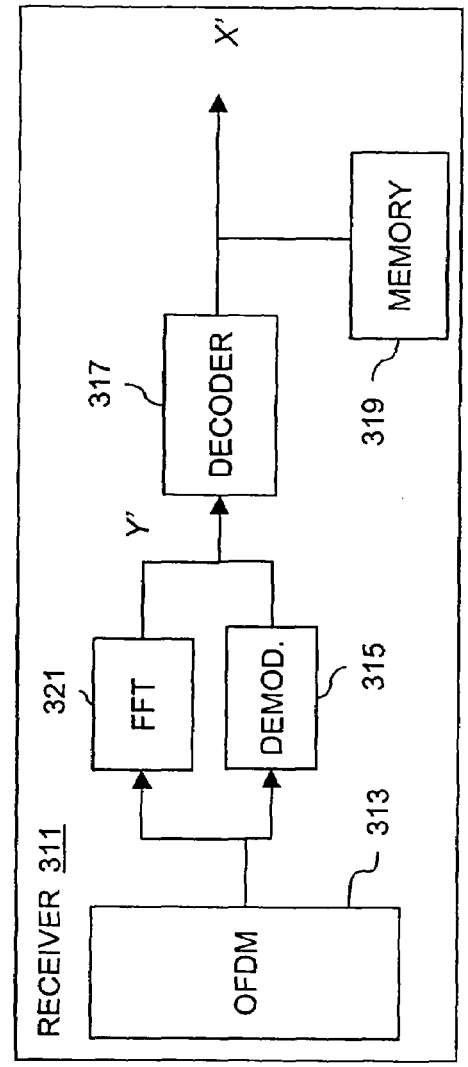

FIG. 3B shows a diagram of a receiver that employs space-frequency codes, according to an embodiment of the present invention. As with receiver 300 of the space-time code approach, receiver 311 processes signals via antennas 309 and includes a demodulator 315, a decoder 317, and a memory 319. Unlike receiver 300, receiver 311 employs an OFDM front-end 313, and includes a fast Fourier transform (FFT) logic 321 that may operate in parallel with the demodulator 315.

The design of space-frequency codes for the OFDM based design approach is described below. These space-frequency codes optimally exploit both spatial and frequency-selective diversity available in the multi-input-multi-output (MIMO) block fading channel. As in the single carrier time domain design approach, attention is focused on trellis based codes because of the availability of reasonable complexity ML decoders. For the purpose of explanation, the discussion pertains to BPSK modulated systems; however, it is recognized by one of ordinary skill in the art that QPSK codes can be obtained by lifting the BPSK codes, as described previously.

The general case in which C is a binary convolutional code of rate $k/L_t L_{ISI}$, is considered. The encoder 203 processes k binary input sequences $x_1(t), x_2(t), \ldots, x_k(t)$ and produces $L_t L_{ISI}$ coded output sequences $y_1(t), y_2(t), \ldots, y_{L_t L_{ISI}}(t)$, which are multiplexed together to form the output code word. The encoder action is summarized by the following matrix equation $$Y(D) = X(D)G(D),$$

where $$Y(D) = [Y_1(D) Y_2(D) \ldots Y_{L_t L_{ISI}}(D)],$$

$$X(D) = [X_1(D) X_2(D) \ldots X_k(D)],$$

and $$G(D) = \begin{bmatrix} G_{1,1}(D) & G_{1,2}(D) & \cdots & G_{1,L_t L_{ISI}}(D) \\ G_{2,1}(D) & G_{2,2}(D) & \cdots & G_{1,L_t L_{ISI}}(D) \\ \vdots & \vdots & \ddots & \vdots \\ G_{k,1}(D) & G_{k,2}(D) & \cdots & G_{k,L_t L_{ISI}}(D) \end{bmatrix}$$

The natural space-time formatting of C is such that the output sequence corresponding to $Y_{(m-1)L_t+l}(D)$ is assigned to the $l^{th}$ transmit antenna in the $m^{th}$ fading block. The algebraic analysis technique considers the rank of matrices formed by concatenating linear combinations of the column vectors $$F_l(D) = \begin{bmatrix} G_{1,l}(D) \\ G_{2,l}(D) \\ \vdots \\ G_{k,l}(D) \end{bmatrix}$$

G is defined to be the set of binary full rank matrices $\{G:G=[g_{i,j}]_{L_t \times L_t}\}$ resulting from applying any number of simple row operations to the identity matrix $I_{L_t}$; and $\forall G_1 \in G$, $1 \leq i \leq L_t 1 \leq i \leq L_{ISI}$.

$$R_l^{(G_m,m)}(D) = [g_{i,1}(m)I_k, g_{i,2}(m)I_k, \ldots, g_{i,L_t}(m)I_k] \begin{bmatrix} F_{(m-1)L_t+1}(D) \\ F_{(m-1)L_t+2}(D) \\ \vdots \\ F_{mL_t}(D) \end{bmatrix}$$

Accordingly, the following algebraic construction for BPSK space-frequency convolutional codes results. In a MIMO OFDM based communications system with $L_t$ transmit antennas 207 operating over a frequency selective block fading channel with $L_{ISI}$ blocks, C denotes the space-frequency code that includes the binary convolutional code C, whose $k \times L_t L_{ISI}$ transfer function matrix is $G(D)=[F_1(D) \ldots F_{L_t L_{ISI}}(D)]$ and the spatial parser σ in which the output $Y_{(m-1)L_t+l}(D)=X(D)F_{(m-1)L_t+l}(D)$ is assigned to antenna l in fading block m. Then, for BPSK transmission, C achieves d levels of transmit diversity if d is the largest integer such that $$\forall\, G_1 \in G, \ldots, G_{L_{ISI}} \in G,\ 0 \le m_1 \le \min(L_t, L_{ISI}L_t - d + 1), \ldots,$$

$$0 \le m_{L_{ISI}} \le \min(L_t, L_{ISI}L_t - d + 1),$$

and $$\sum_{i=1}^{L_{ISI}} m_i = L_{ISI}L_t - d + 1,$$

$$R_{m_1,\ldots,m_{L_{ISI}}}^{(G_1,\ldots,G_{L_{ISI}})}(D) = \left[ R_0^{(G_1,1)}(D), \ldots, R_{m_1}^{(G_1,1)}(D), \right.$$

$$\left. R_0^{(G_2,2)}(D), \ldots, R_{m_2}^{(G_2,2)}(D), \ldots, R_{m_{L_{ISI}}}^{(G_{L_{ISI}},L_{ISI})}(D) \right]$$

has a rank k over the space of all formal series.

The above result allows for constructing convolutional space-frequency codes that realize the optimum tradeoff between transmission rate and diversity order for BPSK modulation with arbitrary coding rate, number of transmit antenna, and number of fading blocks. It is readily seen that this framework encompasses as a special case rate 1/n' convolutional codes with bit or symbol interleaving across the transmit antennas and frequency fading blocks.

Similar to the space-time coding approach, rate $1/L_t$ convolutional codes are considered, wherein the same transmission throughput is achieved. The output sequence from the ith arm $Y_i(D)$ is assigned to the ith antenna. The input assigned to each antenna 207 is then distributed across the different fading blocks using a periodic bit interleaver 209. The design of interleaver 209 depends largely on whether the number of resolvable paths is available at the transmitter 200. In the case in which this information is available at the transmitter 200, the interleaver mapping function π is defined as $$\pi(i) = \left[\frac{i}{L_{ISI}}\right] + \frac{N}{L_{ISI}}(i)_{L_{ISI}},$$

where $O_m$ refers to the modulo m operation, $0 \le i \le N-1$, and N is the code word length, which is assumed to be a multiple of $L_{ISI}$.

In the absence of the prior information on the number of resolvable paths in the channel 103, an interleaving scheme that is capable of exploiting all the frequency diversity, whenever available, for an arbitrary unknown number of paths is needed. In the special case in which the number of paths is restricted to $L_{ISI} = 2^r$ (for any arbitrary integer r) and the maximum possible number of paths $L_{ISI}^{(max)}$ is known at the transmitter 200, the following construction for the universal interleaving map is provided:

$$\pi(i) = \sum_{k=0}^{\log_2(L_{ISI}^{(max)})} a_k \frac{N}{2^{k+1}} + \left[\frac{i}{L_{ISI}^{(i)}}\right],$$

$$a_k = \left( \frac{(i)L_{ISI}^{(max)} - \sum_{j=0}^{k-1} a_j 2^j}{2^k} \right)$$

This interleaving scheme distributes the input sequence periodically among the $L_{ISI}$ fading blocks for any $L_{ISI} = 2^r$ and $L_{ISI} \le L_{ISI}^{(max)}$. In practical applications, $L_{ISI}^{(max)}$ may be chosen to be larger than the maximum number of resolvable paths expected in this particular application, and hence, the transmitter 200 does not need feedback from the receiver 300. This does not result in any loss of performance. If the number of paths is not a power of two, then the diversity advantage is lower bounded by that achieved with the number of paths equal to $L_{ISI}^{(approx)}$) such that $L_{ISI}^{(approx)} = 2^r < L_{ISI}$.

Table 3 shows the diversity advantage that is achieved by the optimal free distance codes when used as space-frequency codes in this scenario. Specifically, Table 3 lists the diversity advantage for BPSK algebraic space-frequency codes with optimal free distance for MIMO frequency selective fading channels.

TABLE 3

| $L_t$ | v | Connection Polynomials | d for $L_{ISI}=1$ | d for $L_{ISI}=2$ | d for $L_{ISI}=3$ | d for $L_{ISI}=4$ |
|---|---|---|---|---|---|---|
| 2 | 2 | 5, 7 | 2 | 4 | 5 | 6 |
|   | 3 | 64, 74 | 2 | 4 | 6 | 7 |
|   | 4 | 46, 72 | 2 | 4 | 6 | 8 |
|   | 5 | 65, 57 | 2 | 4 | 6 | 8 |
|   | 6 | 554, 744 | 2 | 4 | 6 | 8 |
| 3 | 3 | 54, 64, 74 | 3 | 4 | — | — |
|   | 4 | 52, 66, 76 | 3 | 3 | 5 | — |
|   | 5 | 47, 53, 75 | 3 | — | — | — |
|   | 6 | 554, 624, 764 | 3 | — | — | — |
| 4 | 4 | 52, 56, 66, 76 | 4 | — | — | — |
|   | 5 | 53, 67, 71, 75 | 4 | — | — | — |
| 5 | 5 | 75, 71, 73, 65, 57 | 5 | — | — | — |

While, the codes in Table 3 may not realize the maximum possible diversity advantage under all circumstances, these codes a compromise between the diversity advantage and coding gain.

As noted previously, the OFDM based approach addresses the need for a lower complexity maximum likelihood receiver 300. This approach recognizes the fact that the maximum likelihood decoder 317 complexity in the OFDM approach does not increase exponentially with the number of resolvable paths, contrary to the space-time coding approach. It should be noted that this does not mean, however, that complexity of the decoder 317 does not depend on the number of paths. As shown in Table 3, as the number of paths increases, the codes with larger constraint lengths are needed to efficiently exploit the diversity available in the channel 103. Unlike the space-time coding approach, it is possible to trade diversity advantage for a reduction in complexity by choosing a code with a small constraint length. This trade-off is not possible in the space-time coding approach because, irrespective of the constraint length of the code, the complexity of the (ML) decoder 305 grows exponentially with the number of resolvable paths. The OFDM based approach, however, provides a relatively lower diversity advantage over the space-time coding approach.

The maximum transmit diversity advantage achieved in a BPSK OFDM MIMO wireless system with $L_t$ transmit antennas 207 and $L_{ISI}$ resolvable paths/antenna supporting a throughput of 1 bps/Hz is $L_{ISI}(L_t-1)+1$. It is clear that the maximum diversity advantage under this approach is lower as compared to the space-time coding approach (i.e, $L_t L_{ISI}$). The results in Tables 1 and 3 compare the diversity advantage achieved by space-time codes and space-frequency codes for different values of $L_t$ and $L_{ISI}$. As will be evident from the discussion below, this loss in diversity advantage may not always lead to a performance loss in the frame error rate range of interest.

Figure 4:
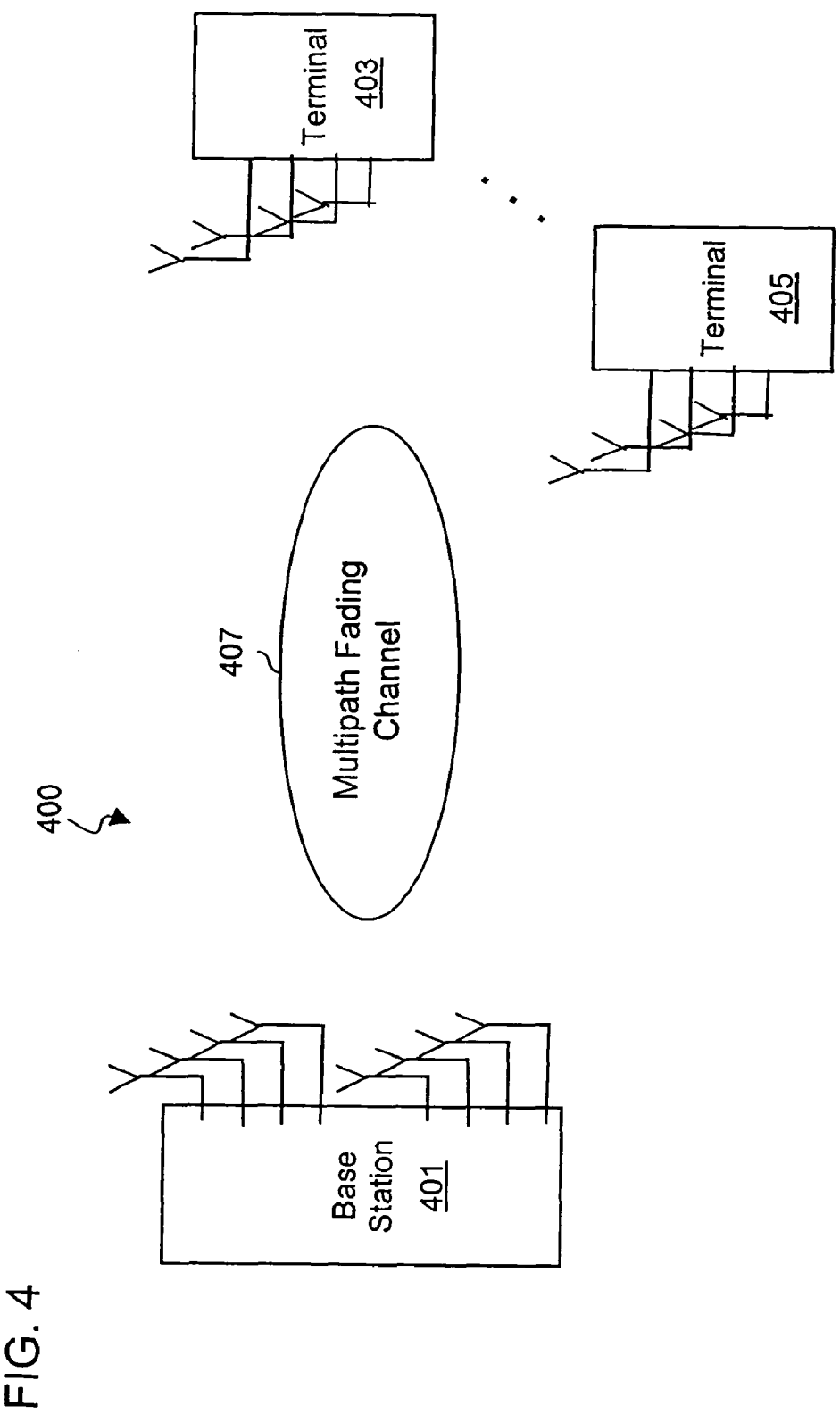
FIG. 4 is a diagram of a communications system that supports multichannel multipoint distribution services using multi-input multi-output transceivers, according to the embodiments of the present invention.

FIG. 4 shows a diagram of a communications system that supports multichannel multipoint distribution services using multi-input multi-output transceivers, according to the embodiments of the present invention. The present invention provides a physical layer (PHY) for broadband fixed wireless access, as supported by the system 400. A base station 401 communicates with multiple terminals 403, 405 over a communications channel 407, which in this example is characterized by multipath fading. The system 400 exploits the additional temporal (or frequency) diversity available in the channel 407, thereby improving data rates. Each of the terminals 403, 405 as well as the base station 401 is equipped with an encoder 203 (as shown in FIG. 2) that generates space-time (ST) or space-frequency codes. ST coding is well-suited to adapting to subscriber density variation. In an exemplary embodiment, the error rate, after application of the appropriate error correction mechanism (e.g., ARQ), that is delivered by the PHY layer to a Medium Access Control (MAC) layer satisfies IEEE (Institute of Electrical and Electronics Engineers) 802 functional requirements, e.g., bit error rate (BER) is $10^{-9}$. The base station 401 transmits parallel data streams to the terminals 403, 405 using OFDM with QPSK (TDD or FDD), along with ARQ. It is noted that Quadrature Amplitude Modulation (QAM) may also be used.

OFDM handles delay spread with low complexity at the receiver. OFDM transforms frequency-selective multi-path channel into block fading channel, a highly efficient way to deal with multi-paths. For a practical delay spread, the complexity can be significantly lower than that of a high-speed, single carrier system with an equalizer. The MIMO transceivers of the base station 401 use space-time codes in LOS environment to increase capacity, which is dependent on the number of antennas. The system 400 can also be used in a near or non-LOS by taking advantage of the multipath characteristics of the channel 407 (e.g., assuming the frequency is between about 2-5 GHz). Conventional approaches for line-of-sight (LOS) coverage provides only limited capacity, limited availability, and is potentially difficult to install the cell site (i.e., base station). Highly sectored solutions are impractical due to propagation environment and non-uniform subscriber distribution; high-order modulation are sensitive to multipath and other impairments.

In an exemplary embodiment, the return channel to the base station 401 is a low power, narrower band. It is noted that an asymmetric number of antennas from the base station 401 to terminal 403, 405 can be used, in part, to reduce cost of the customer premises equipment. Accordingly, the MIMO architecture may provide a single transmit antenna and two receive antennas at the terminals 403, 405; alternatively, these terminals 403, 405 may have a configuration in two transmit antennas and two receive antennas are used. At the base station 401, four transmit antennas and four receive antennas may be implemented, as shown. To increase capacity, different polarizations (i.e., left and right) are supported by the system 400 in the frequency reuse pattern.

It is recognized that the terminals 403, 405 and the base station 401 may be configured to operate using space-frequency codes. As mentioned previously, the choice of space-time codes versus space-frequency codes depends largely on the trade-off between receiver complexity and the desired diversity advantage.

Unlike the conventional approach to providing fixed wireless access, which operates only with LOS coverage with limited capacity and availability, the system 400 supports high capacity and availability, thereby providing a via alternative to high speed terrestrial access technologies, such as Digital Subscriber Line (DSL). The system 400 advantageously permits more flexibility in the trade-off between rate and diversity advantage.

Figure 5:
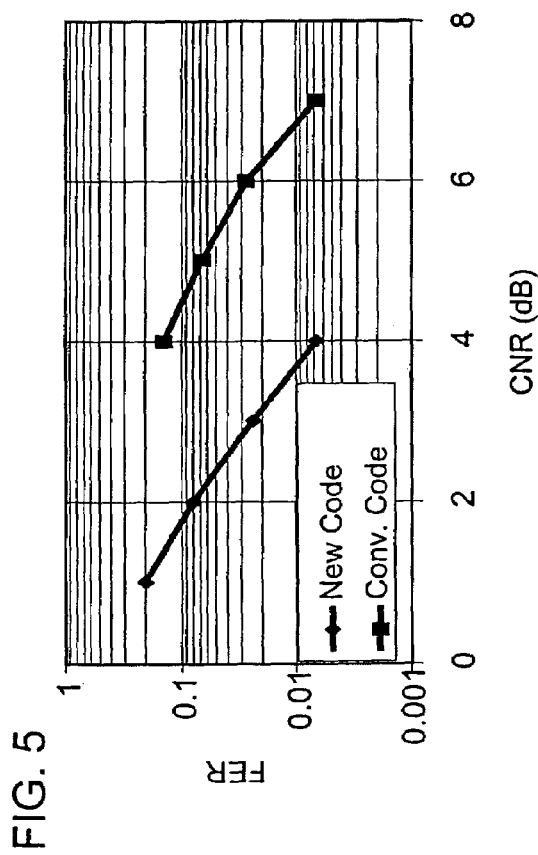
FIG. 5 is a graph of the performance of a four transmit/four receive antenna system employed in the system of FIG. 4, according to embodiments of the present invention.
Figure 6:
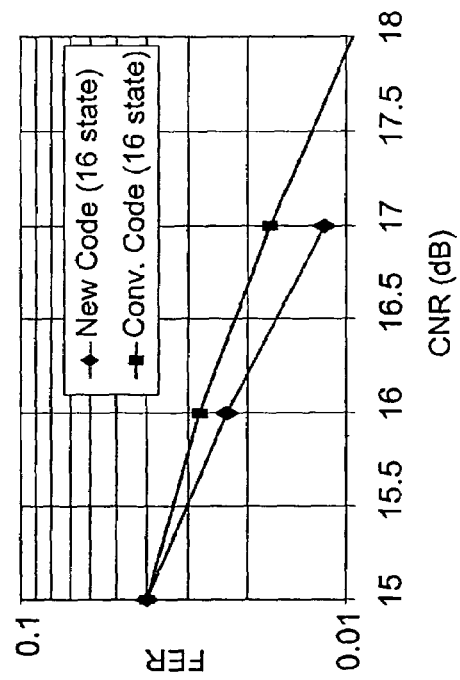
FIG. 6 is a graph of the performance of a two transmit/one receive antenna system, employed in the system of FIG. 4, according to embodiments of the present invention.

FIG. 5 shows a graph of the performance of a four transmit/four receive antenna system employed in the system of FIG. 4, according to embodiments of the present invention. In a four transmit antenna/four receive antenna configuration, as used in the base station 401 (FIG. 4), for a given Frame Error Rate (FER), the conventional system requires a higher Carrier to Noise Ratio (CNR)—i.e., over 3 dBs greater. The frame size, in an exemplary embodiment, is 256 information bits; a desirable FER is 1%, and a bandwidth of 6 Mhz. For example, a FER of 0.01 requires about 3.5 dBs using the coding and modulation scheme of the system 400, while the conventional system needs over 6.5 dBs to attain an equivalent FER. As a broadband system, the system 400 implies large delay spread relative to transmission symbol interval. For example, at 6 MHz transmission rate, a delay spread of 10 msec extends over 60 symbols. The performance parameters of FIG. 5 are achieved using Binary Phase Shift Keying (BPSK). FIG. 6 shows the FER versus CNR for an antenna configuration that may be deployed in the terminals 403, 405 of the system 400.

FIG. 6 shows a graph of the performance of a two transmit/one receive antenna system, employed in the system of FIG. 4, according to embodiments of the present invention. The results of FIG. 6 assumes a QPSK modulation scheme. As shown, CNR improvements become greater as the FER gets reduced. At an FER of 0.01, the system 400 shows an improvement of 1 dB.

Accordingly, the system 400 may support fixed wireless radio channels for various data applications (e.g., Internet access). These applications are particularly suitable for small office/home office (SOHO) environments.

Figure 7:
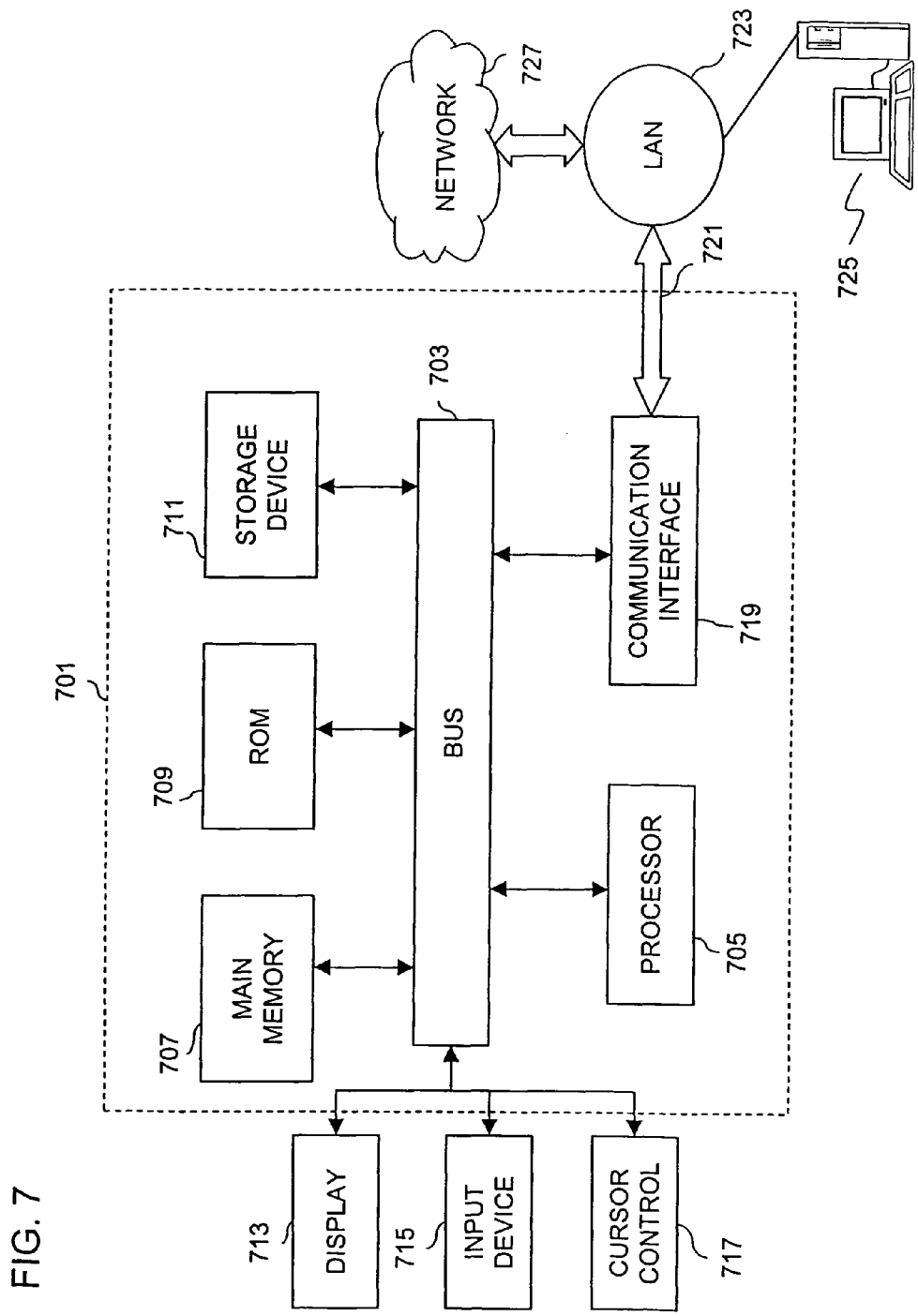
FIG. 7 is a diagram of a computer system that can perform the processes of encoding and decoding of space-time codes, in accordance with embodiments of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, the space-time encoding is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although only a single communication interface 717 is shown, it is recognized that multiple communication interfaces may be employed to communicate with different networks and devices.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 703 may execute the transmitted code while being received and/or store the code in storage device 79, or other non-volatile storage for later execution. In this manner, computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention provides a MMDS system that employs space-time codes to transmit and receives signals under LOS and non-LOS operating conditions via MIMO transceivers. The system utilizes orthogonal frequency division multiplexing (OFDM) with a quadrature phase shift keying (QPSK) sub-carrier modulation, according to one embodiment of the present invention. The space-time coding, which may be adaptive, effectively exploits the use of the MIMO transceivers. Further, the MMDS system provides an automatic repeat requests (ARQ) error control mechanism.

While the present invention has been described in connection with a number of embodiments and implementations, the present invention is not so limited but covers various obvious modifications and equivalent arrangements, which fall within the purview of the appended claims.

REFERENCES

[1] E. Teletar. Capacity of Multi-Antenna Gaussian Channels. *Technical Report, AT&T-Bell Labs*, June 1995.

[2] G. J. Foschini and M. Gans. On the Limits of Wireless Communication in a Fading Environment When Using Multiple Antennas. *Wireless Personal Communication*, 6:311-335, March 1998.

[3] V. Tarokh, N. Seshadri, and A. R. Calderbank. Space-Time Codes for High Data Rate Wireless Communication: Performance Criterion and Code Construction. *IEEE Trans. Info. Theory*, IT-44:774-765, March 1998.

[4] J.-C. Guey, M. R. Bell M. P. Fitz, and W.-Y. Kuo. Signal Design for Transmitter Diversity, Wireless Communications systems over Rayleigh Fading Channels. *IEEE Vehicular Technology Conference*, pages 136-140, Atlanta, 1996.
[5] G. J. Foschini. Layered Space-Time Architecture for Wireless Communication in Fading Environments When Using Multiple Antennas. *Bell Labs Tech. J.* 2, Autumn 1996.
[6] S. Lin and Jr. D. J. Costello. *Error Control Coding: Fundamentals and Applications*. Prentice-Hall, New Jersey, 1983.

What is claimed is:

1. A method of encoding, comprising:
receiving an input signal; and
generating an encoded signal, based on the input signal, using space-frequency coding, wherein the space-frequency coding includes use of a transfer function matrix that is one of a set of binary full-rank matrices, and wherein a structure of each matrix of the set of binary full-rank matrices is defined based at least in part on a number of paths in an intersymbol interference (ISI) channel and a number of antennas.

2. The method according to claim 1, wherein the encoded signal is modulated according to a predetermined modulation scheme and an orthogonal frequency division multiplexing scheme.

3. The method according to claim 2, wherein the modulated signal is transmitted using multiple transceivers.

4. The method according to claim 3, wherein the encoding step is adaptive based on quantity of the transceivers.

5. The method according to claim 3, wherein the encoded signal is transmitted according to an error control scheme that includes automatic repeat request (ARQ).

6. The method according to claim 1, wherein the antennas include at least one of a set of two transmit antennas and two receive antennas, a set of four transmit antennas and four receive antennas, or a set of four transmit antennas and two receive antennas.

7. The method according to claim 1, wherein the encoding step is based on a rate ½ trellis-based code.

8. An apparatus comprising:
an encoder configured to receive an input signal, and to generate an encoded signal, based on the input signal, using space-frequency coding, wherein the space-frequency coding includes use of a transfer function matrix that is one of a set of binary full-rank matrices, and wherein a structure of each matrix of the set of binary full-rank matrices is defined based at least in part on a number of paths in an intersymbol interference (ISI) channel and a number of antennas.

9. The apparatus according to claim 8, wherein the encoded signal is modulated according to a predetermined modulation scheme and an orthogonal frequency division multiplexing scheme.

10. The apparatus according to claim 9, the modulated signal is transmitted using multiple transceivers.

11. The apparatus according to claim 10, wherein the encoder adaptively encodes based on quantity of the transceivers.

12. The apparatus according to claim 10, wherein the encoded signal is transmitted according to an error control scheme that includes automatic repeat request (ARQ).

13. The apparatus according to claim 8, wherein the antennas include at least one of a set of two transmit antennas and two receive antennas, a set of four transmit antennas and four receive antennas, or a set of four transmit antennas and two receive antennas.

14. The apparatus according to claim 8, wherein the encoder encodes based on a rate ½ trellis-based code.

* * * * *